(12) United States Patent
Hausler et al.

(10) Patent No.: US 12,233,701 B2
(45) Date of Patent: Feb. 25, 2025

(54) STRUCTURAL ASSEMBLY AND VEHICLE HAVING STRUCTURAL ASSEMBLY

(71) Applicant: Ford Global Technologies, LLC, Dearborn, MI (US)

(72) Inventors: Henry W. Hausler, New Hudson, MI (US); Conor Daniel Hennessey, South Hadley, MA (US); Scott J. Bell, Northville, MI (US); Patrick Daniel Maguire, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 323 days.

(21) Appl. No.: 17/966,383

(22) Filed: Oct. 14, 2022

(65) Prior Publication Data

US 2024/0123808 A1    Apr. 18, 2024

(51) Int. Cl.
| | |
|---|---|
| *B60K 1/04* | (2019.01) |
| *B62D 21/02* | (2006.01) |
| *H01M 10/0525* | (2010.01) |
| *H01M 50/204* | (2021.01) |
| *H01M 50/244* | (2021.01) |
| *H01M 50/249* | (2021.01) |
| *H01M 50/262* | (2021.01) |

(52) U.S. Cl.
CPC ............ *B60K 1/04* (2013.01); *B62D 21/02* (2013.01); *H01M 10/0525* (2013.01); *H01M 50/204* (2021.01); *H01M 50/244* (2021.01); *H01M 50/249* (2021.01); *H01M 50/262* (2021.01); *B60K 2001/0438* (2013.01); *H01M 2220/20* (2013.01)

(58) Field of Classification Search
CPC ....... B60K 1/04; B62D 21/02; H01M 50/249; H01M 50/262; H01M 50/244; H01M 50/204
See application file for complete search history.

(56) References Cited

U.S. PATENT DOCUMENTS

| | | | |
|---|---|---|---|
| 4,365,681 A * | 12/1982 | Singh ..................... | B60L 50/64 180/68.5 |
| 8,702,161 B2 | 4/2014 | Charbonneau et al. | |
| 8,739,907 B2 * | 6/2014 | Storc ....................... | B60K 1/04 180/68.5 |
| 10,358,168 B2 | 7/2019 | Atsumi et al. | |
| 10,967,720 B2 | 4/2021 | Caliskan et al. | |
| 11,351,850 B1 * | 6/2022 | Calandruccio ........... | B60K 1/00 |

(Continued)

FOREIGN PATENT DOCUMENTS

CN    108357565    8/2018

*Primary Examiner* — John D Walters
(74) *Attorney, Agent, or Firm* — Burris Law, PLLC

(57) ABSTRACT

A structural assembly for an electric vehicle includes a vehicle frame and a battery structure. The vehicle frame is distinct from a vehicle body and includes a front section, a rear section and a mid-section disposed between the front and rear sections. The mid-section includes opposed longitudinal rails. The battery structure is configured to house power storage units and is disposed between the opposed longitudinal rails. The battery structure includes a battery housing secured to the opposed longitudinal rails of the mid-section. The mid-section and the battery housing are combined into a unitized structure that is removably secured to the front and rear sections of the vehicle frame.

20 Claims, 5 Drawing Sheets

(56) References Cited

U.S. PATENT DOCUMENTS

| | | |
|---|---|---|
| 11,355,809 B2 * | 6/2022 | Matsushima ....... H01M 50/244 |
| 2012/0090907 A1 | 4/2012 | Store et al. |
| 2021/0104717 A1 | 4/2021 | Matsushima et al. |

* cited by examiner

STRUCTURAL ASSEMBLY AND VEHICLE HAVING STRUCTURAL ASSEMBLY

FIELD

The present disclosure relates to a structural assembly and a vehicle having a structural assembly.

BACKGROUND

The statements in this section merely provide background information related to the present disclosure and may not constitute prior art.

Electric vehicles differ from conventional motor vehicles because they are driven by one or more rechargeable battery packs having lithium-ion batteries, for example, or any other suitable electrical power storage units. The battery pack typically powers one or more motors to drive a set of wheels. The size and weight of the battery pack is typically greater for electric vehicles capable of traveling long distances (e.g., electric vehicles capable of traveling more than 500 miles). Depending on the mounting location relative to the rest of the electric vehicle, the battery pack may be susceptible to various vehicle loads.

Integration of rechargeable battery packs into the structure of existing vehicles and providing efficient load paths in a variety of operating conditions can be challenging, primarily due to the increased weight of the battery packs and their larger footprint in the vehicle.

The present disclosure addresses these and other issues related to the integration of rechargeable battery packs in electric vehicles.

SUMMARY

This section provides a general summary of the disclosure and is not a comprehensive disclosure of its full scope or all of its features.

In one form, the present disclosure provides a structural assembly for an electric vehicle that includes a vehicle frame and a battery structure. The vehicle frame is distinct from a vehicle body. The vehicle frame includes a front section, a rear section and a mid-section disposed between the front and rear sections. The mid-section includes opposed longitudinal rails. The battery structure is configured to house power storage units and is disposed between the opposed longitudinal rails. The battery structure includes a battery housing secured to the opposed longitudinal rails of the mid-section. The mid-section and the battery housing are combined into a unitized structure that is removably secured to the front and rear sections of the vehicle frame.

In variations of the structural assembly of the above paragraph, which may be implanted individually or in combination: the mid-section and the battery housing being combined into the unitized structure includes the mid-section and the battery housing fixed to each other; the mid-section includes a width that is greater than a width of the front section and greater than a width of the rear section; a set of first fasteners mechanically couples a front end of the mid-section of the vehicle frame and the front section of the vehicle frame to each other; a set of second fasteners mechanically couples a rear end of the mid-section of the vehicle frame and the rear section of the vehicle frame to each other; a plurality of mounts are secured to the opposed longitudinal rails; a plurality of body isolators, each body isolator disposed on a respective mount and between the respective mount and the vehicle body; a suspension system is connected to the front section and the rear section; each of the opposed longitudinal rails includes internal stiffening members; each side of the battery housing is directly engaged to a respective longitudinal rail of the opposed longitudinal rails; and a plurality of cross members are disposed within the battery housing and extends in a transverse direction relative to a longitudinal direction of the electric vehicle, each cross member of the plurality of cross members includes opposed ends that contact respective sides of the battery housing.

In another form, the present disclosure provides a structural assembly for an electric vehicle that includes a vehicle frame and a battery structure. The vehicle frame is distinct from a vehicle body. The vehicle frame includes a front section, a rear section and a mid-section disposed between the front and rear sections. The mid-section includes opposed longitudinal rails. Each longitudinal rail of the opposed longitudinal rails includes a front end having a front stepped interface and a rear end having a rear stepped interface. The battery structure is configured to house power storage units and is disposed between the opposed longitudinal rails. The battery structure includes a battery housing secured to the opposed longitudinal rails of the mid-section. The mid-section and the battery housing are combined into a unitized structure. The front stepped interfaces of the opposed longitudinal rails are removably secured to the front section of the vehicle frame and the rear stepped interfaces of the opposed longitudinal rails are removably secured to the rear section of the vehicle frame.

In variations of the structural assembly of the above paragraph, which may be implanted individually or in combination: each front stepped interface includes a first pocket that a respective first portion of the front section is received, each rear stepped interface includes a second pocket that a respective second portion of the rear section is received; the respective first portion of the front section is substantially flush with an outboard side wall of a respective longitudinal rail of the opposed longitudinal rails and substantially flush with an uppermost wall of the respective longitudinal rail of the opposed longitudinal rails, and the respective second portion of the rear section is substantially flush with the outboard side wall of the respective longitudinal rail of the opposed longitudinal rails and substantially flush with the uppermost wall of the respective longitudinal rail of the opposed longitudinal rails; a set of first fasteners mechanically coupling the front stepped interfaces of the mid-section of the vehicle frame and the front section of the vehicle frame to each other; and a set of second fasteners mechanically coupling the rear stepped interfaces of the mid-section of the vehicle frame and the rear section of the vehicle frame to each other.

In yet another form, the present disclosure provides an electric vehicle that includes a vehicle body, a vehicle frame and a battery structure. The vehicle frame is distinct from a vehicle body. The vehicle frame includes a front section, a rear section and a mid-section disposed between the front and rear sections. The mid-section includes opposed longitudinal rails. The battery structure is configured to house power storage units and is disposed between the opposed longitudinal rails. The battery structure includes a battery housing secured to the opposed longitudinal rails of the mid-section. The mid-section and the battery housing are combined into a unitized structure that is removably secured to the front and rear sections of the vehicle frame.

In variations of the electric vehicle of the above paragraph, which may be implanted individually or in combination: a plurality of mounts are secured to the opposed longitudinal rails; a plurality of body isolators, each body isolator disposed on a respective mount and between the respective mount and the vehicle body; and the vehicle body includes a pair of opposed rockers, each rocker of the opposed rockers is supported by the vehicle frame by the plurality of mounts and the plurality of the body isolators.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
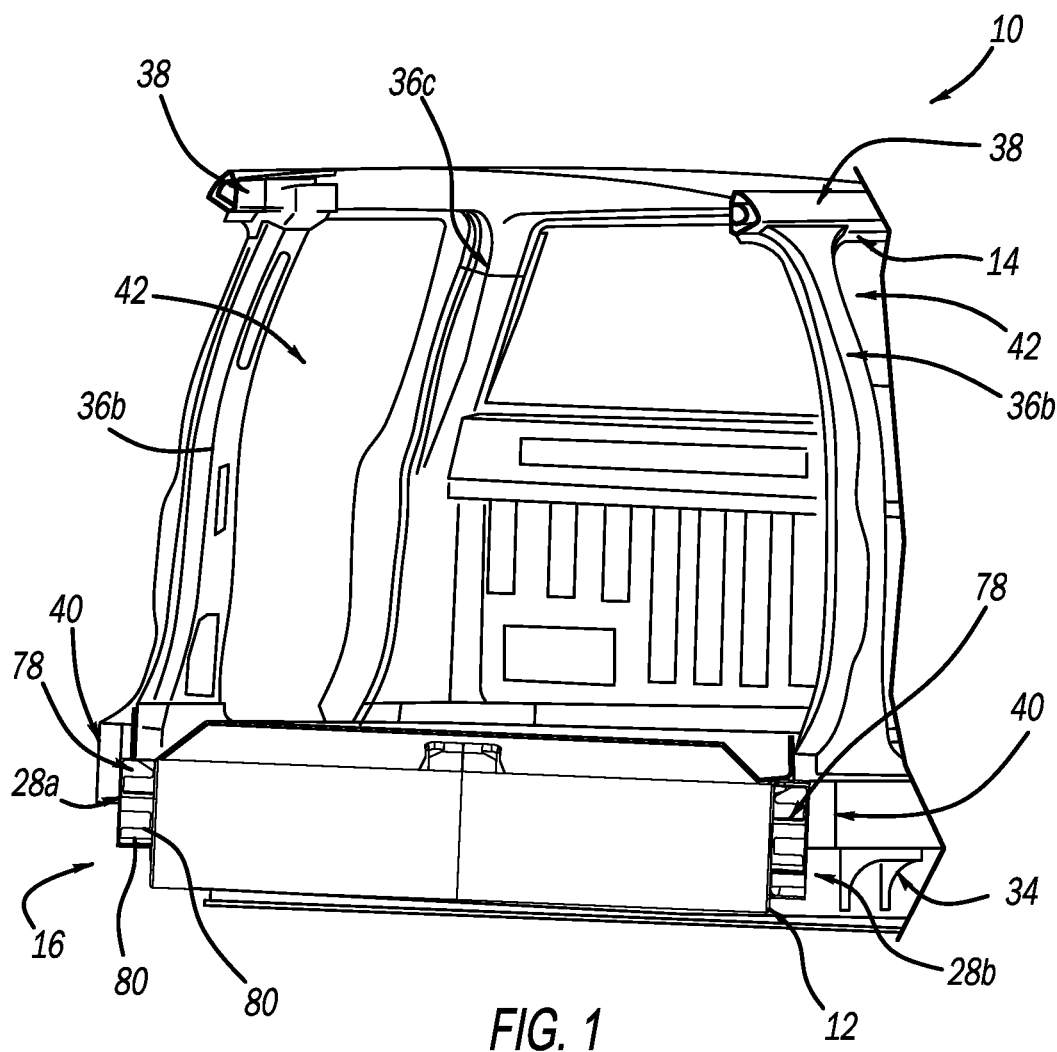
FIG. 1 is a cross-sectional perspective view of a vehicle according to the principles of the present disclosure, the vehicle including a vehicle frame and vehicle body.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As shown in FIG. 1, a vehicle 10 such as an electric vehicle is provided. In the example provided, the electric vehicle is a battery electric vehicle (BEV). In other examples, the electric vehicle may be a hybrid electric vehicle (HEV), a plug-in electric vehicle (PHEV), or a fuel cell vehicle. The vehicle 10 includes a battery structure 12, a vehicle body 14 and a vehicle frame 16. The battery structure 12 may be rechargeable and may include lithium-ion batteries, solid-state batteries, or any other suitable electrical power storage units. The battery structure 12 may be disposed at various locations of the vehicle 10 and may be secured to the vehicle frame 16. In this way, the battery structure 12 is supported by the vehicle frame 16 and is remote from a passenger cabin and cargo compartments (not shown) of the vehicle 10, therefore, not occupying space that would otherwise be available for passengers or cargo. The battery structure 12 powers one or more motors to drive a set of drive wheels. For example, the battery structure 12 may power a rear motor (not shown) to drive rear wheels (not shown) of a set of rear wheels via a rear axle (not shown) and/or may power a front motor (not shown) to drive front wheels (not shown) of a set of front wheels via a front axle (not shown).

Figure 2:
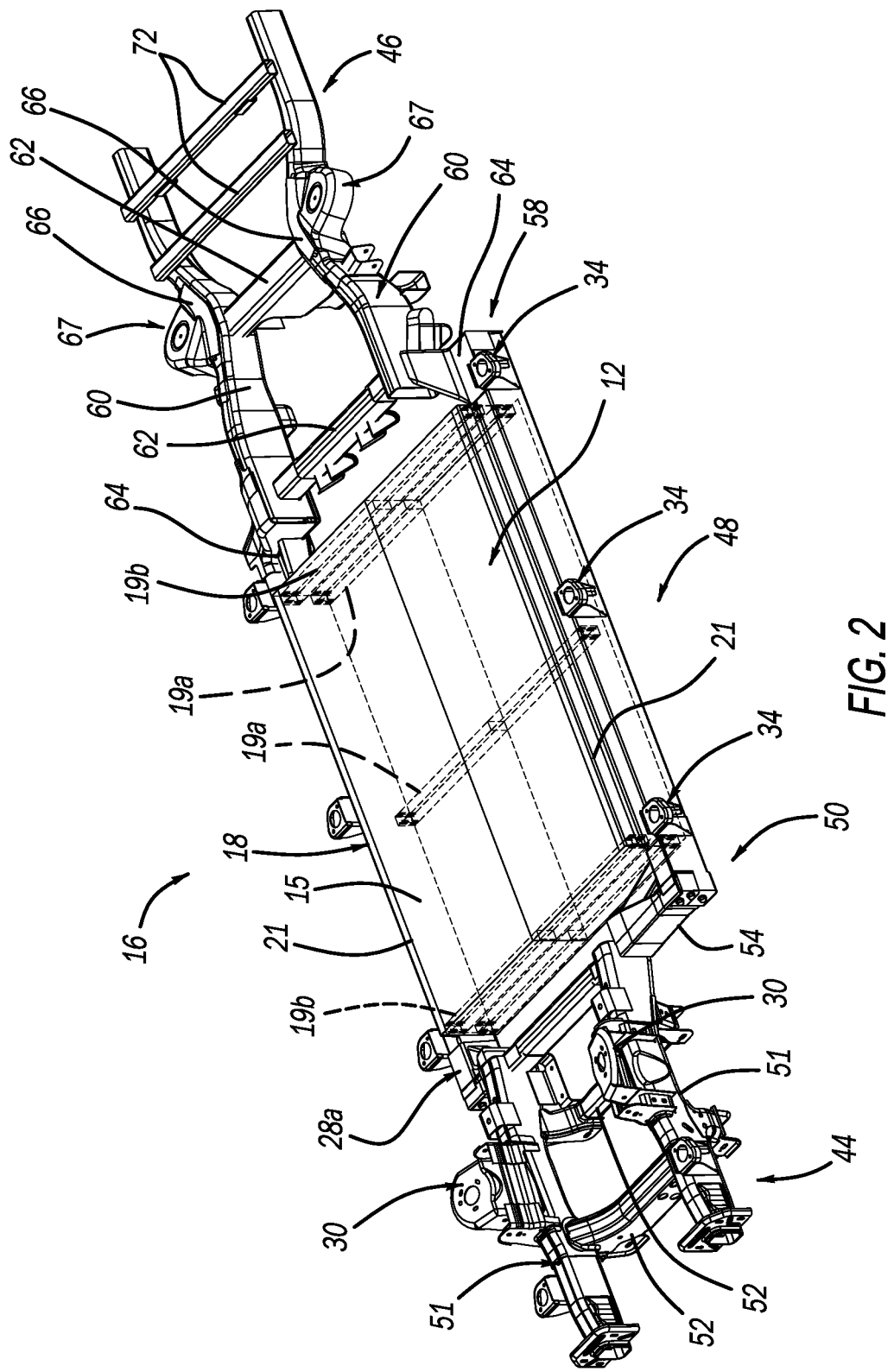
FIG. 2 is a perspective view of the vehicle frame of the vehicle of FIG. 1.

With reference to FIG. 2, the battery structure 12 includes a lid 15, an outer support frame or battery housing 18 and internal cross members 19*a*, 19*b*. The lid 15 is removably coupled to the battery housing 18 via mechanical fasteners such as bolts or screws (not shown), for example. In this way, the lid 15 may be removed to service the battery arrays (not shown) disposed within the battery housing 18. A seal (not shown) is disposed around a periphery of the battery housing 18 and is engaged with the battery housing 18 and the lid 15. In this way, fluids, debris and other materials are inhibited from entering into the battery housing 18. The internal cross members 19*a*, 19*b* are disposed within the battery housing 18 and extend in a transverse direction of the vehicle 10. The internal cross members 19*a* abut against a bottom wall of the battery housing 18. The internal cross members 19*a* are spaced apart along a longitudinal direction of the vehicle 10 and may connect opposed side walls 21 of the battery housing 18.

Figure 3:
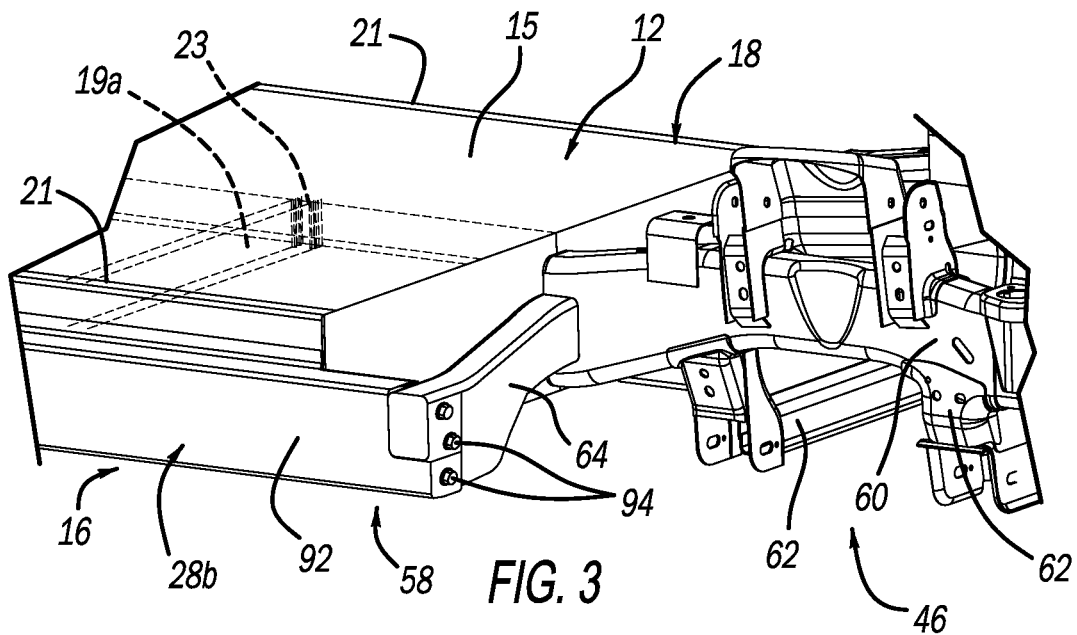
FIG. 3 is a top perspective view of a portion of the vehicle frame of FIG. 1.

Referring to FIG. 3, The internal cross members 19*a*, 19*b* are secured to the opposed side walls 21 and include deformation features 23 formed at ends of the internal cross members 19. In this way, the amount of deformation and location of the deformation of the internal cross members 19*a*, 19*b* are controlled. In the example illustrated, the deformation features 23 are indentations formed at the ends of the internal cross members 19*a*, 19*b*. Returning to FIG. 2, in the example illustrated, one or more of the internal cross members 19*a* may be vertically aligned with one internal cross member 19*b* within the battery housing 18. Stated differently, one or more internal cross members 19*a* may be positioned below one internal cross member 19*b* within the battery housing 18. The internal cross members 19*b* may be positioned above the internal cross members 19*a* at the front of the battery housing 18 and at the rear of the battery housing 18.

Referring to FIGS. 1 and 2, the vehicle body 14 is separate (distinct) from and mounted on the vehicle frame 16. Stated differently, the vehicle body 14 is mounted on a plurality of mounts 34 secured to the vehicle frame 16. Jounce bumpers or body isolators (not shown) may be disposed on a respective mount 34 and between the respective mount 34 and the vehicle body 14. The vehicle body 14 includes cross members (not shown) extending above the vehicle frame 16 and the battery structure 12.

With reference to FIG. 1, the vehicle body 14 also includes a front end (not shown), a plurality of pillars (e.g., A-pillars (not shown), B-pillars 36*b*, C-pillars 36*c* (one of which is shown), hinge pillars (not shown)), roof rails 38, and rockers 40. In one example, the front end includes, inter alia, a bumper (not shown) that extends in a transverse direction relative to a longitudinal direction of the vehicle 10 and is secured to the vehicle frame 16 by energy absorbing members.

The A-pillars (not show), the B-pillars 36*b*, the C-pillars 36*c*, the hinge pillars (not shown), the rockers 40 and the roof rails 38 cooperate to define front door openings (not shown) in the vehicle body 14. The B-pillars 36*b*, the C-pillars 36*c*, the rockers 40 and the roof rails 38 cooperate to define rear door openings 42 in the vehicle body 14. Doors (not shown) are rotatably coupled to the vehicle body 14 (e.g., hinge pillars or the B-pillars 36*b*) to be rotated between a closed position in which the doors are disposed within the front door openings or the rear door openings 42, and an open position in which the doors are removed from the front door openings or the rear door openings 42.

Each rocker 40 is elongated and extends along the longitudinal direction of the vehicle 10. Each rocker 40 is spaced apart from respective opposed longitudinal rail 28a, 28b of the vehicle frame 16. A front end of the rocker 40 is housed within or otherwise secured to a respective hinge pillar (i.e., the front end of the rocker 40 may be disposed within a cavity of the respective hinge pillar).

Figure 5:
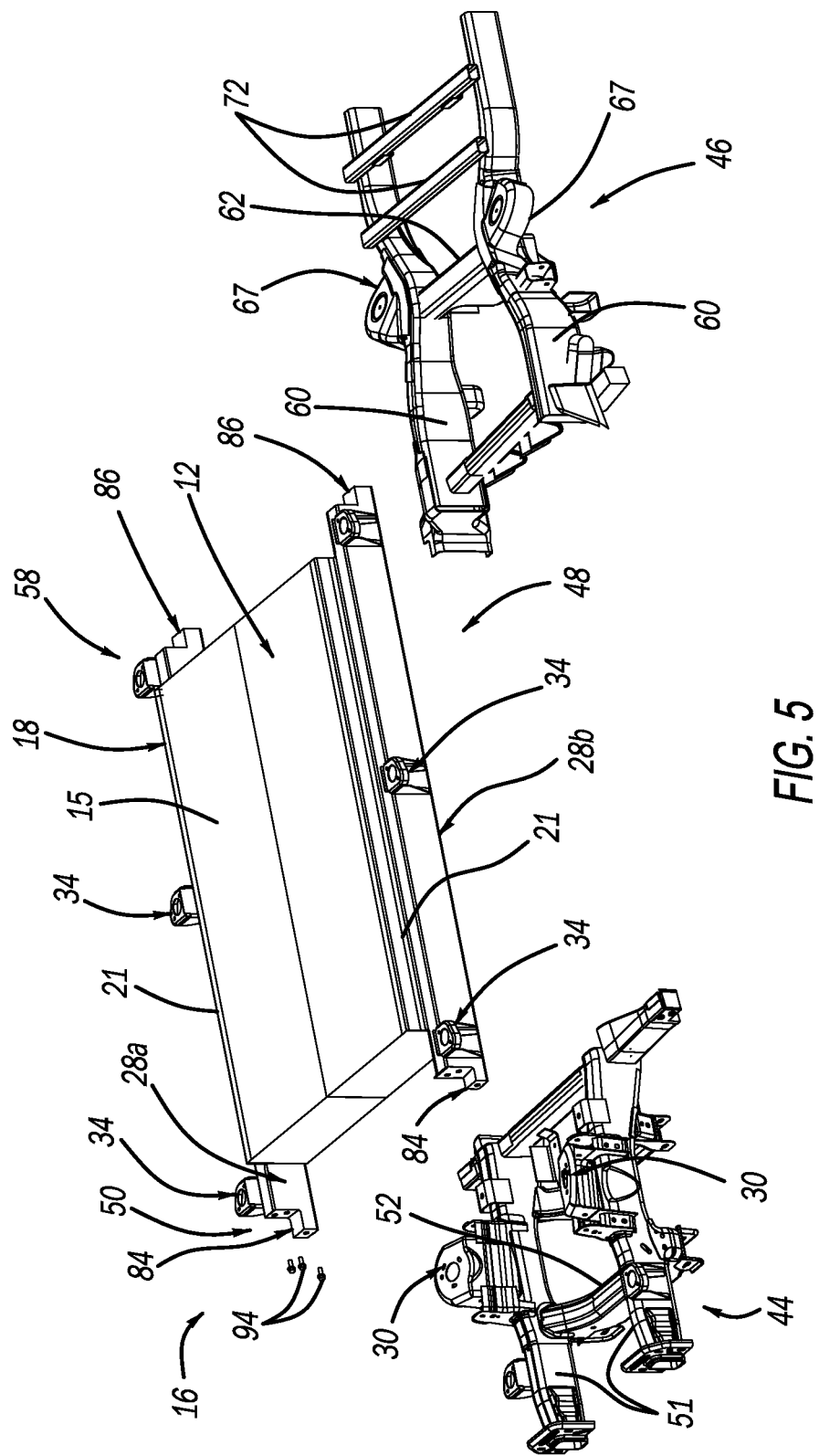
FIG. 5 is an exploded view of the vehicle frame of FIG. 1.

The vehicle frame 16 is made of a metal material such as steel, for example, and may be manufactured by a roll forming process, for example. The vehicle frame 16 is the main supporting structure of the vehicle 10, to which various components are attached either directly or indirectly. For example, as shown in FIGS. 2 and 5, suspension mounts 30 are secured to the vehicle frame 16 and secure a suspension system to the vehicle frame 16. The suspension system provides a smooth ride by absorbing energy from various road bumps while driving and assists the wheels (not shown) to remain in contact with the road. The suspension system includes various components such as upper and lower control arms, springs, shock absorbers, struts, and ball joints, for example. In another example, a spare tire may be secured to the vehicle frame 16.

As shown in FIGS. 2 and 5, the vehicle frame 16 includes a front section or front torque box 44, a rear section 46 or rear torque box, and a mid-section 48 disposed between the front and rear sections 44, 46. The front section 44 is secured to a front end 50 of the mid-section 48 and includes a pair of opposed lateral members 51, a plurality of connecting members 52, and a pair of opposed arms 54. The lateral members 51 extend generally along the longitudinal direction of the vehicle 10 and are interconnected via the connecting members 52 extending in a transverse direction relative to the longitudinal direction of the vehicle 10. Front ends of the lateral members 51 are secured to the bumper structure (not shown), for example. The suspension mounts 30 are secured to the lateral members 51 and secure the suspension system to the front section 44 of the vehicle frame 16. Each arm 54 extends outwardly (i.e., in an outboard direction) from a rear end of a respective lateral member 51 and is secured to the front end 50 of the mid-section 48. In other words, the mid-section 48 is wider in the lateral or transverse direction of the vehicle 10 than the front section 44.

The rear section 46 is secured to a rear end 58 of the mid-section 48 and includes a pair of opposed lateral members 60, a plurality of connecting members 62, and a pair of opposed arms 64. The lateral members 60 extend generally along the longitudinal direction of the vehicle 10 and are interconnected via the connecting members 62 extending in a transverse direction relative to the longitudinal direction of the vehicle 10. A mid-portion 66 of each lateral member 60 may optionally protrude inwardly toward a center of the vehicle frame 16 (i.e., in an inboard direction). A mounting structure 67 may be secured to a respective lateral member 60 at the mid-portion 66 and is configured to mount a vehicle component (e.g., the suspension system) to the rear section 46 of the vehicle frame 16.

Each arm 64 extends outwardly from a front end of a respective lateral member 60 and is secured to the rear end 58 of the mid-section 48. In other words, the mid-section 48 is wider in the lateral or transverse direction of the vehicle 10 than the rear section 46. In the example provided, each arm 64 is attached to the respective lateral member 60 at a location that is above a location where the arm 64 is attached to the mid-section 48. Cross bars 72 are secured to the lateral members 60 and extend in a transverse direction relative to the longitudinal direction of the vehicle 10. The cross bars 72 are mounted on the lateral members 60 and are configured to support a vehicle component (e.g., a spare tire) mounted to the rear section 46 of the vehicle frame 16.

The mid-section 48 includes the opposed longitudinal rails 28a, 28b that are spaced apart from each other and that are substantially parallel. The mid-section 48 is also fixed to the side walls 21 of the battery housing 18. In this way, the mid-section 48 and the battery housing 18 are combined into a unitized structure that is removably secured to the front section 44 of the vehicle frame 16 and the rear section 46 of the vehicle frame 16. The rails 28a, 28b have a length that is greater than a length of the front section 44 and greater than a length of the rear section 46. The rails 28a, 28b also have a height that is less than a height of the side walls 21 of the battery housing 18.

It should be understood that the mid-section 48 does not include cross members to accommodate the battery structure 12. The plurality of mounts 34 are secured to and along a respective rail 28a, 28b of the mid-section 48 of the vehicle frame 16. Each rail 28a, 28b is located between a respective rocker 40 (FIG. 1) and the battery housing 18 of the battery structure 12. The mid-section 48 of the vehicle frame 16 is a region of the vehicle frame 16 where the rails 28a, 28b are forward a location where the rear section 46 (i.e., opposed lateral members 60 and the opposed arms 64) angle inboard proximate a rear of the vehicle and rearward a location where the front section 44 (i.e., the opposed lateral members 51 and the opposed arms 54) angle inboard proximate a front of the vehicle 10.

Referring to FIG. 1, each rail 28a, 28b has a rectangular shape that includes an internal cavity 78. In the example illustrated, the internal cavity 78 includes internal stiffening members 80. In some forms, foam material may be disposed within the internal cavity 78 addition to, or instead of, the internal stiffening members 80.

Figure 6:
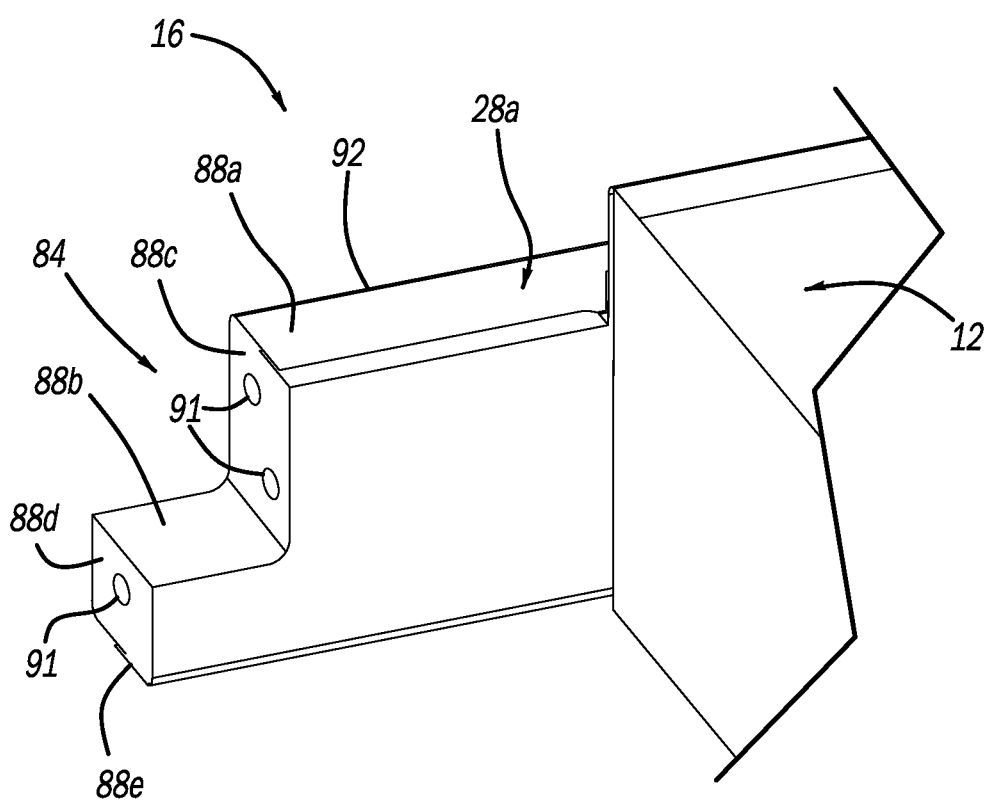
FIG. 6 is a perspective view of one stepped interface of a mid-section of the vehicle frame of FIG. 1.

With reference to FIGS. 5 and 6, each rail 28a, 28b includes a front stepped interface 84 that is secured to the front section 44 and a rear stepped interface 86 that is secured to the rear section 46. The rear stepped interfaces 86 may be similar to the front stepped interfaces 84 but facing rearward, as shown in FIG. 5. Thus, only one front stepped interface 84 is illustrated in FIG. 6 and described herein in detail. Stated differently, each of the stepped interfaces 84, 86 includes a first horizontal wall 88a, a second horizontal wall 88b, a first vertical wall 88c and a second vertical wall 88d. While described as being a "horizontal wall" or a "vertical wall" it should be understood that the walls need not be exactly horizontal or vertical and may be substantially horizontal or substantially vertical.

The first horizontal wall 88a is defined by an uppermost wall of the rail 28a, 28b and is located above the second horizontal wall 88b. The first horizontal wall 88a extends along the longitudinal direction of the vehicle 10 and has a length that is greater than a length of the second horizontal wall 88b. The second horizontal wall 88b is positioned between the first horizontal wall 88a and a lowermost wall 88e of the rail 28a, 28b. The second horizontal wall 88b also extends in a direction parallel to the first horizontal wall 88a and is positioned between the first and second vertical walls 88c, 88d. The vertical wall 88c extends downward from an end of the first horizontal wall 88a to an end of the second horizontal wall 88b and faces forward. Stated differently, the vertical wall 88c is positioned between the first and second horizontal walls 88a, 88b.

The first and second vertical walls 88c, 88d each include one or more apertures 91 formed therein. The walls 88a, 88b, 88c cooperate to form the stepped interface 84, 86 configured to receive a respective arm 54, 64. That is, the respective arm 54, 64 is supported on the second horizontal wall 88b. An outboard end of each respective arm 54, 64 may optionally be substantially flush with an outboard side wall 92 of the rail 28a, 28b and may optionally be substantially flush with the first horizontal wall 88a of the rail 28a, 28b.

Figure 4:
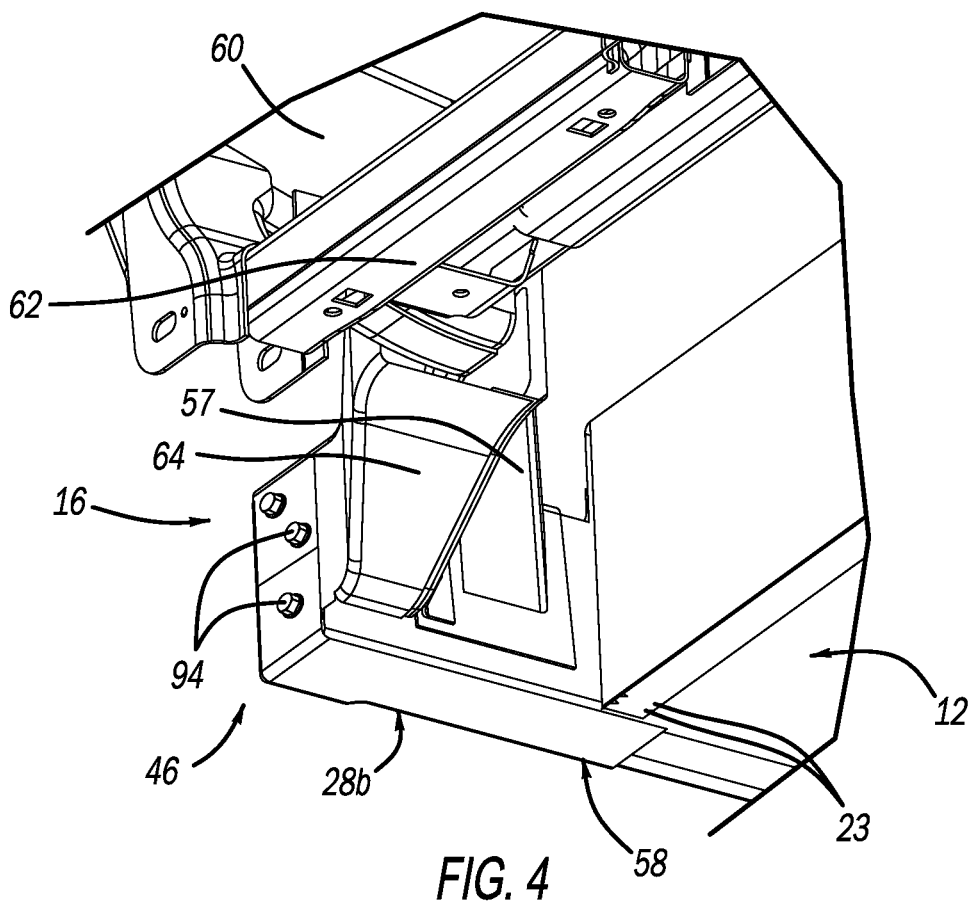
FIG. 4 is a bottom perspective view of a portion of the vehicle frame of FIG. 1, illustrated with a battery housing removed for clarity.

As shown in FIGS. 2-4, a plurality of fasteners 94 extend through a respective arm 54, 64 and extend through respective apertures 91 of the stepped interfaces 84, 86. In this way, the mid-section 48 is removably coupled to the front section 44 of the vehicle frame 16 and the rear section 46 of the vehicle frame 16.

A structural assembly of the present disclosure includes the vehicle frame 16 and the vehicle body 14. The mid-section 48 (i.e., the section of the rails 28a, 28b located at opposing sides of the battery structure 12) and the battery structure 12 being combined into a unitized structure improves the strength and the stiffness of the unitized structure while reducing the overall width of the vehicle 10. The unitized structure being removable from the front section 44 and the rear section 46 also allows for serviceability of the battery structure 12.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A structural assembly for an electric vehicle, the structural assembly comprising:
   a vehicle frame distinct from a vehicle body, the vehicle frame including a front section, a rear section and a mid-section disposed between the front and rear sections, the mid-section comprising opposed longitudinal rails; and
   a battery structure configured to house power storage units and disposed between the opposed longitudinal rails, the battery structure comprising a battery housing secured to the opposed longitudinal rails of the mid-section,
   wherein the mid-section and the battery housing are combined into a unitized structure that is removably secured to the front and rear sections of the vehicle frame.

2. The structural assembly of claim 1, wherein the mid-section and the battery housing being combined into the unitized structure comprises the mid-section and the battery housing fixed to each other.

3. The structural assembly of claim 1, wherein the mid-section includes a width that is greater than a width of the front section and greater than a width of the rear section.

4. The structural assembly of claim 1, further comprising:
   a set of first fasteners mechanically coupling a front end of the mid-section of the vehicle frame and the front section of the vehicle frame to each other; and
   a set of second fasteners mechanically coupling a rear end of the mid-section of the vehicle frame and the rear section of the vehicle frame to each other.

5. The structural assembly of claim 1, further comprising a plurality of mounts secured to the opposed longitudinal rails.

6. The structural assembly of claim 1, further comprising:
   a plurality of mounts secured to the opposed longitudinal rails; and
   a plurality of jounce bumpers, each jounce bumper disposed on a respective mount and between the respective mount and the vehicle body.

7. The structural assembly of claim 1, wherein a suspension system is connected to the front section and the rear section.

8. The structural assembly of claim 1, wherein each of the opposed longitudinal rails includes internal stiffening members.

9. The structural assembly of claim 1, wherein each side of the battery housing is directly engaged to a respective longitudinal rail of the opposed longitudinal rails.

10. The structural assembly of claim 1, further comprising a plurality of cross members disposed within the battery housing and extending in a transverse direction relative to a longitudinal direction of the electric vehicle, each cross member of the plurality of cross members includes opposed ends that contact respective sides of the battery housing.

11. A structural assembly for an electric vehicle, the structural assembly comprising:
    a vehicle frame distinct from a vehicle body, the vehicle frame including a front section, a rear section and a mid-section disposed between the front and rear sections, the mid-section comprising opposed longitudinal rails, each longitudinal rail of the opposed longitudinal rails includes a front end having a front stepped interface and a rear end having a rear stepped interface; and
    a battery structure configured to house power storage units and disposed between the opposed longitudinal rails, the battery structure comprising a battery housing secured to the opposed longitudinal rails of the mid-section,
    wherein the mid-section and the battery housing are combined into a unitized structure, and wherein the front stepped interfaces of the opposed longitudinal rails are removably secured to the front section of the vehicle frame and the rear stepped interfaces of the opposed longitudinal rails are removably secured to the rear section of the vehicle frame.

12. The structural assembly of claim 11, wherein the mid-section and the battery housing being combined into the unitized structure comprises the mid-section and the battery housing fixed to each other.

13. The structural assembly of claim 11, wherein the mid-section includes a width that is greater than a width of the front section and greater than a width of the rear section.

14. The structural assembly of claim 11, wherein each front stepped interface includes a first pocket that a respective first portion of the front section is received, and wherein each rear stepped interface includes a second pocket that a respective second portion of the rear section is received.

15. The structural assembly of claim 14, wherein:
    the respective first portion of the front section is substantially flush with an outboard side wall of a respective longitudinal rail of the opposed longitudinal rails and substantially flush with an uppermost wall of the respective longitudinal rail of the opposed longitudinal rails, and the respective second portion of the rear section is substantially flush with the outboard side wall of the respective longitudinal rail of the opposed longitudinal rails and substantially flush with the uppermost wall of the respective longitudinal rail of the opposed longitudinal rails.

16. The structural assembly of claim 11, further comprising a set of first fasteners mechanically coupling the front stepped interfaces of the mid-section of the vehicle frame and the front section of the vehicle frame to each other.

17. The structural assembly of claim 16, further comprising a set of second fasteners mechanically coupling the rear stepped interfaces of the mid-section of the vehicle frame and the rear section of the vehicle frame to each other.

18. An electric vehicle comprising:
a vehicle body;
a vehicle frame distinct from the vehicle body, the vehicle frame including a front section, a rear section and a mid-section disposed between the front and rear sections, the mid-section comprising opposed longitudinal rails; and
a battery structure configured to house power storage units and disposed between the opposed longitudinal rails, the battery structure comprising a battery housing secured to the opposed longitudinal rails of the mid-section,
wherein the mid-section and the battery housing are combined into a unitized structure that is removably secured to the front and rear sections of the vehicle frame.

19. The electric vehicle of claim 18, further comprising:
a plurality of mounts secured to the opposed longitudinal rails; and
a plurality of jounce bumpers, each jounce bumper disposed on a respective mount and between the respective mount and the vehicle body.

20. The electric vehicle of claim 19, wherein the vehicle body includes a pair of opposed rockers, and wherein each rocker of the opposed rockers is supported by the vehicle frame by the plurality of mounts and the plurality of jounce bumpers.

* * * * *